United States Patent
Miller

(10) Patent No.: US 7,116,468 B2
(45) Date of Patent: Oct. 3, 2006

(54) DESIGN OF QUASI-PHASEMATCHED OPTICAL FREQUENCY CONVERTERS

(75) Inventor: Gregory D. Miller, Sunnyvale, CA (US)

(73) Assignee: Collinear Corporation, Santa Clara, CA (US)

( * ) Notice: Subject to any disclaimer, the term of this patent is extended or adjusted under 35 U.S.C. 154(b) by 0 days.

(21) Appl. No.: 11/299,161

(22) Filed: Dec. 8, 2005

(65) Prior Publication Data

US 2006/0132902 A1    Jun. 22, 2006

Related U.S. Application Data

(60) Provisional application No. 60/639,121, filed on Dec. 22, 2004.

(51) Int. Cl.
G02F 1/35    (2006.01)

(52) U.S. Cl. .................................................. 359/326

(58) Field of Classification Search ......... 359/326–332
See application file for complete search history.

(56) References Cited

U.S. PATENT DOCUMENTS

| | | | |
|---|---|---|---|
| 5,434,700 A | 7/1995 | Yoo .......................... | 359/332 |
| 5,640,405 A | 6/1997 | Wallace et al. ............... | 372/21 |
| 5,644,584 A | 7/1997 | Nam et al. .................... | 372/20 |
| 5,815,307 A * | 9/1998 | Arbore et al. ............... | 359/328 |
| 5,825,517 A | 10/1998 | Antoniades et al. .......... | 398/50 |
| 5,867,303 A | 2/1999 | Mohatt et al. ............... | 359/328 |
| 5,867,304 A | 2/1999 | Galvanauskas et al. ..... | 359/333 |
| 5,912,910 A | 6/1999 | Sanders et al. ............... | 372/22 |
| 5,912,997 A | 6/1999 | Bischel et al. ............... | 385/15 |
| 5,995,522 A | 11/1999 | Scherrer et al. ............. | 372/21 |
| 6,016,214 A | 1/2000 | Meyer, Jr. et al. ........... | 359/237 |
| 6,021,141 A | 2/2000 | Nam et al. .................... | 372/20 |
| 6,078,600 A | 6/2000 | Gruen ......................... | 372/21 |
| 6,081,369 A | 6/2000 | Waarts et al. .......... | 359/341.33 |
| 6,097,540 A | 8/2000 | Neuberger et al. .......... | 359/618 |
| 6,154,310 A | 11/2000 | Galvanauskas et al. ..... | 359/328 |

(Continued)

FOREIGN PATENT DOCUMENTS

WO    WO 03/058337    7/2003

OTHER PUBLICATIONS

Fejer et al, "Quasi-Phase-Matched Second Harmonic Generation: Tuning and Tolerances", IEEE Journal of Quantum Electronics, vol. 28, No. 11, Nov. 1992, pp. 2631-2654.*

(Continued)

Primary Examiner—John D. Lee
(74) Attorney, Agent, or Firm—Lumen Intellectual Property Services, Inc.

(57) ABSTRACT

Quasi-phasematching design to provide an approximation to a desired spectral amplitude response A(f) is provided. An initial phase response φ(f) corresponding to A(f) is generated. Preferably, $d^2\phi(f)/df^2$ is proportional to $A^2(f)$. A function h(x) is computed such that h(x) and H(f)=A(f)exp(iφ(f)) are a Fourier transform pair. A domain pattern function d(x) is computed by binarizing h(x) (i.e., approximating h(x) with a constant-amplitude approximation). In some cases, the response provided by this d(x) is sufficiently close to A(f) that no further design work is necessary. In other cases, the design can be iteratively improved by modifying φ(f) responsive to a difference between the desired response A(f) and the response provided by domain pattern d(x). Various approaches for binarization are provided. The availability of multiple binarization approaches is helpful for making design trades (e.g., in one example, fidelity to A(f) can be decreased to increase efficiency and to increase domain size).

25 Claims, 5 Drawing Sheets

U.S. PATENT DOCUMENTS

| | | | |
|---|---|---|---|
| 6,304,237 B1 | 10/2001 | Karakawa | 345/84 |
| 6,714,569 B1 | 3/2004 | Zhu et al. | 372/22 |
| 7,009,759 B1* | 3/2006 | Chou et al. | 359/326 |
| 2002/0118439 A1 | 8/2002 | Batchko | 359/326 |
| 2002/0154663 A1 | 10/2002 | Zhu et al. | 372/22 |
| 2003/0123497 A1 | 7/2003 | Huang et al. | 372/21 |

OTHER PUBLICATIONS

Seki et al, "Fabrication of quasi-phase-matched C/L inter-bands wavelength converter with LPE grown LiNbO3 thin films." Department of Applied Physics, Waseda University, 4 pp.

J.B.D. Soole et al, "Multistripe Array Grating Integrated Cavity (Magic) Laser: A New Semiconductor Laser For WDM Applications" Electronics Letters, Sep. 10, 1992, vol. 28, No. 19 pp. 1805-1807.

C.H. Joyner, "Low-Threshold Nine-Channel Waveguide Grating Router-Based Continuous Wave Transmitter," Journal of Lightwave Technology, vol. 17, No. 4, Apr. 1999, pp. 647-651.

Shiming Gao, "Flat Broad-Band Wavelength Conversion Based on Sinusoidally Chirped Optical Superlattices in Lithium Niobate," IEEE Photonics Technology Letters, vol. 16, No. 2, Feb. 2004, pp. 557-559.

S.J.B. Yoo, "Wavelength Conversion Technologies For WDM Network Applications," Journal of Lightwave Technology, vol. 14, No. 6, June 1996, pp. 955-966.

J.P.R. Lacey; S.J. Madden; and M.A. Summerfield, "Four-Channel Polarization-Insensitive Optically Transparent Wavelength Converter," IEEE Photonics Technology Letters, vol. 9, No. 10, Oct. 1997, pp. 1355-1357.

M.L. Bortz; M. Fujimura; and M.M. Fejer, "Increased Acceptance Bandwidth for Quasi-Phasematched Second Harmonic Generation in LiNbO$_3$ Waveguides," Electronics Letters, vol. 30, Jan. 6, 1994, pp. 34-35.

L. Becouarn, et al., "Cascaded Second-Harmonic and Sum-Frequency Generation of a $CO_2$ Laser Using a Single Quasi-Phasematched GaAs Crystal," Conference on Lasers and Electro-Optics, IEEE, vol. 6, pp. 146-147, May 1998.

C.Q. Xu; H. Okayama; and M. Kawahara, "1.5μm Band Efficient Broadband Wavelength Conversion By Difference Frequency Generation in a Periodically Domain-Inverted LiNbO$_3$ Channel Waveguide," Applied Physics Letters, vol. 63, 27 Dec. 1993, pp. 3559-3561.

I. Brener, et al., "Polarisation-insensitive wavelength converter based on cascaded nonlinearities in LiNbO$_3$ waveguides," Electronics Letters, vol. 36, Jan. 6, 2000, No. 1, pp. 66-67.

M.H. Chou et al., "Optical Signal Processing and Switching with Second-Order Nonlinearities in Waveguides," IEICE Transactions on Electronics, vol. E-83-C, No. 6, Jun. 2000, pp. 869-874.

M.H. Chou, et al., "1.5-μm-Band Wavelength Conversion Based on Cascaded Second-Order Nonlinearity in LiNbO$_3$ Waveguides," IEEE Photonics Technology Letters, vol. 11, No. 6, Jun. 1999, pp. 653-655.

M.H. Chou et al., "Efficient Wide-Band and Tunable Midspan Spectral Inverter Using Cascaded Nonlinearities in LiNbO$_3$ Waveguides," IEEE Photonics Technology Letters, vol. 12, No. 1, Jan. 2000, pp. 82-84.

M.H. Chou et al., "Stability and badwidth enhancement of difference frequency generation (DFG)-based wavelength conversion by pump detuning," Electronics Letter, vol. 35, No. 12, Jun. 10, 1999, pp. 978-980.

M.H. Chou et al., "Multiple-Channel Wavelength Conversion by use of engineered quasi-phase-matching structures in LiNbO$_3$ waveguides," Optics Letters, vol. 24, No. 16, Aug. 15, 1999, pp. 1157-1159.

* cited by examiner

DESIGN OF QUASI-PHASEMATCHED OPTICAL FREQUENCY CONVERTERS

CROSS REFERENCE TO RELATED APPLICATIONS

This application claims the benefit of U.S. provisional application 60/639,121, filed on Dec. 22, 2004, entitled "Design of Quasi-phasematched Optical Frequency Converters" and hereby incorporated by reference in its entirety.

FIELD OF THE INVENTION

This invention relates to nonlinear frequency conversion.

BACKGROUND

Nonlinear optical frequency conversion includes any process where one or more optical inputs provided to a nonlinear optical device produce one or more optical outputs, where the output radiation includes radiation at one or more frequencies (or wavelengths) not present in the input radiation. Examples of nonlinear frequency conversion include second harmonic generation (SHG), sum frequency generation (SFG), difference frequency generation (DFG), four wave mixing, third harmonic generation, parametric oscillation, etc. Many nonlinear optical processes require phase-matching to proceed efficiently. If the phase matching condition is satisfied, then the nonlinear interaction proceeds constructively along the entire active length of the device, while if the phase matching condition is not satisfied, then radiation from different parts of the nonlinear device interferes destructively to reduce conversion efficiency. As a result, investigation of such processes (e.g., second order processes such as DFG, SFG, and SHG) has concentrated primarily on methods for phase-matching.

The phase-matching condition can be expressed in geometrical terms. For example, phase-matching for SHG requires the wave vector of the second harmonic wave to be twice as long as the wave vector of the input wave (i.e., the pump wave). Due to material dispersion (i.e., the wavelength dependence of the index of refraction), the SHG phase matching condition is ordinarily not satisfied. Birefringent phase-matching (BPM) and quasi phase-matching (QPM) are two methods of phase-matching that have been extensively investigated. In BPM, birefringent materials are employed and the interaction geometry and wave polarization are selected such that the phase matching condition is satisfied. For example, the pump and second harmonic waves can have the same index of refraction to phase-match SHG. In QPM, the nonlinear device is spatially modulated to provide phase matching. For example, periodic spatial modulation of a nonlinear device can provide a device k-vector K such that $2 k_p \pm K = k_{sh}$ to phase-match SHG, where $k_p$ is the pump wave vector and $k_{sh}$ is the second harmonic wave vector. A common method of providing spatial modulation for QPM is to controllably alter the sign of the nonlinear coefficient (e.g., by poling a ferroelectric material).

In more general terms, QPM can be regarded as a method for engineering the spectral response of a nonlinear optical device to provide various desirable results. From this point of view, periodic QPM is a special case of QPM that is especially appropriate for maximizing conversion efficiency at a single set of input and output wavelengths. Other design constraints can lead to various non-periodic QPM methods. For example, in U.S. Pat. No. 5,815,307 and U.S. Pat. No. 5,867,304 aperiodic QPM is employed in connection with frequency conversion of short optical pulses. Since short pulses include multiple wavelengths, periodic QPM optimized for a single wavelength is not preferred. In U.S. Pat. No. 6,016,214, a QPM grating having multiple sections, each having a different period, is employed to phase-match multiple nonlinear processes. In U.S. Pat. No. 6,714,569 and U.S. Pat. No. 5,640,405, QPM for two or more nonlinear processes simultaneously is also considered.

Increasing the wavelength acceptance bandwidth by periodic or aperiodic phase reversal is considered by Bortz et al., in Electronic Letters 30(1), pp34–35, 1994. Sinusoidally chirped QPM is considered by Gao et al., in Photonics Technology Letters, 16(2), pp557–559, 2004. Combination of a phase reversal grating and a periodic grating for QPM is considered by Chou et al., in Optics Letters, 24(16), pp1157–1159, 1999.

In some cases, it is desirable to specify a nonlinear device spectral response (e.g., normalized SHG efficiency) over a range of frequencies. In such cases, the above-described methods may or may not be applicable, depending on whether or not the desired spectral response falls into the set of spectral responses provided by the method. For example, QPM gratings having several periodic sections provide a spectral response having several peaks, each peak having characteristic side lobes due to the sin(x)/x (i.e., sinc(x)) response from each grating section. If the desired spectral response is one or several sinc-like peaks, then this method is applicable. If the desired spectral response is different (e.g., the side lobes need to be eliminated), then this method may not be applicable.

Accordingly, it would be an advance in the art to provide QPM having a specified spectral response (or tuning curve).

SUMMARY

The invention enables QPM design to provide an approximation to a desired spectral amplitude response A(f). An initial phase response $\phi(f)$ corresponding to A(f) is generated. Preferably, $d^2\phi(f)/df^2$ is proportional to $A^2(f)$. A function h(x) is computed such that h(x) and $H(f)=A(f)\exp(i\phi(f))$ are a Fourier transform pair. A domain pattern function d(x) is computed by binarizing h(x) (i.e., approximating h(x) with a constant-amplitude approximation). In some cases, the response provided by this d(x) is sufficiently close to A(f) that no further design work is necessary. In other cases, the design can be iteratively improved by modifying $\phi(f)$ responsive to a difference between the desired response A(f) and the response provided by domain pattern d(x). Various approaches for binarization are provided. The availability of multiple binarization approaches is helpful for making design trades (e.g., in one example, fidelity to A(f) can be decreased to increase efficiency and to increase domain size).

DETAILED DESCRIPTION

Figure 1:
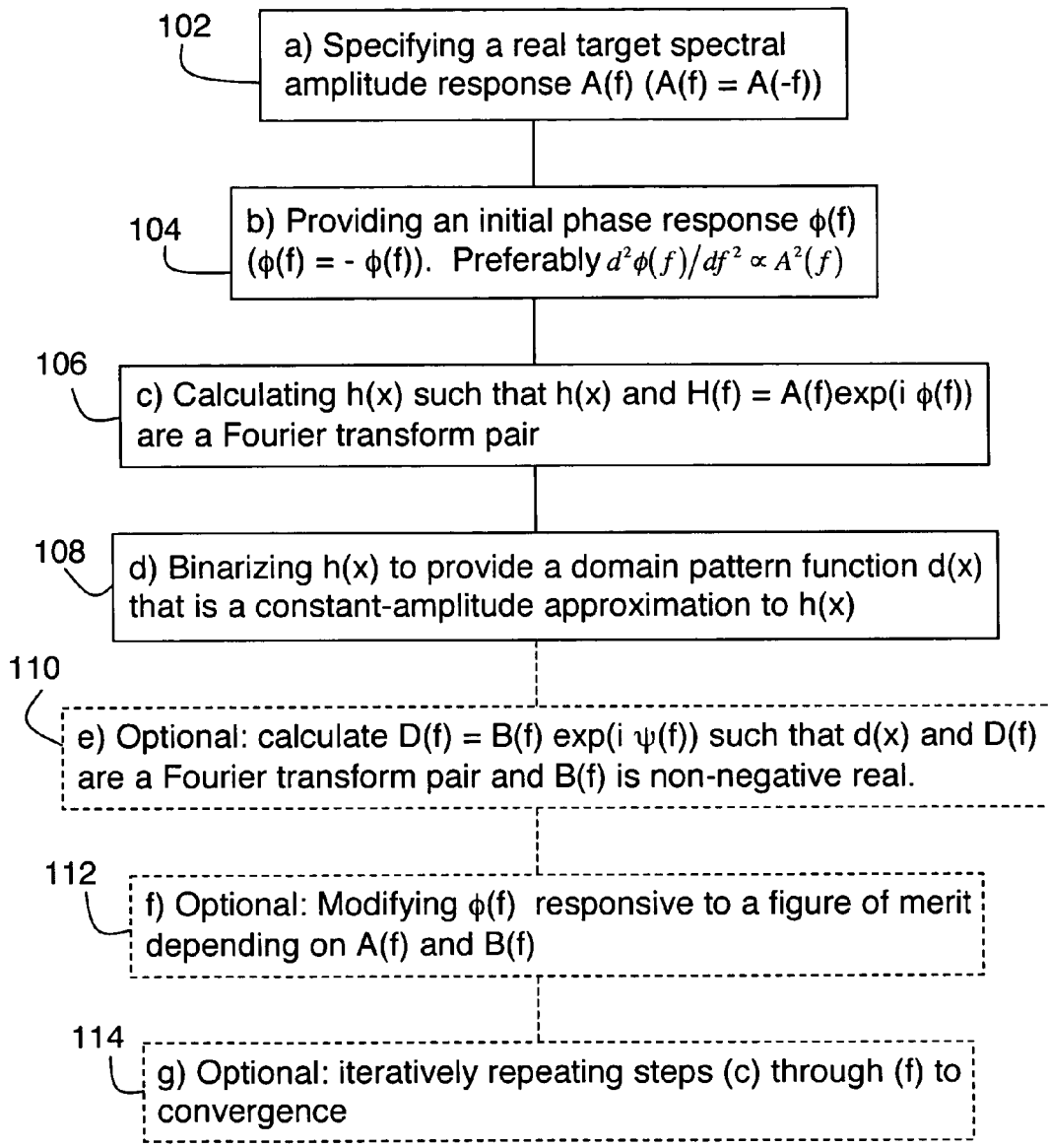
FIG. 1 shows a QPM method according to an embodiment of the invention.

FIG. 1 shows a QPM method according to an embodiment of the invention. Step 102 on FIG. 1 is specifying a target spectral amplitude response $A(f)$. The response $A(f)$ describes the desired spectral (i.e., as a function of wavelength) performance of the QPM device being designed. More specifically, $A^2(f)$ is the desired relative spectral power efficiency of the device, so $A(f)$ is referred to as an amplitude response. In practice, $A^2(f)$ may be given, from which $A(f)$ can readily be derived. Thus the QPM design problem can be regarded as choosing a domain pattern function $d(x)$ that provides a spectral amplitude response $B(f)$ that is sufficiently close to the target spectral amplitude response $A(f)$. The specification of $A(f)$ should span the frequency range(s) of interest, including any range(s) where zero response is desired.

Here it is assumed that QPM is accomplished by changing the sign of the nonlinear coefficient in a controlled manner (e.g., by controlled domain poling of a ferroelectric nonlinear material). Under this assumption, the domain pattern function $d(x)$ has sign reversals at each domain boundary, but $|d(x)|$ is a constant. It is convenient (but not required) to normalize the calculations such that $|d(x)|=1$. With this normalization of $d(x)$, it is clear that the amplitude response $A(f)$ can be correspondingly normalized. Thus the response $A(f)$ is to be regarded as a relative response, in the sense that multiplication of $A(f)$ by a wavelength-independent factor does not essentially change the QPM design problem being specified. Such normalization is well known in the art, as is the equivalence between normalized and non-normalized QPM formalisms.

It is also well known in the art that there is a Fourier transform relation between the domain pattern function $d(x)$ and spectral response $D(f)$ of a QPM nonlinear device. More specifically, $d(x)$ and $D(f)$ are a Fourier transform pair. Here (and throughout this description) x is position and f is frequency or any suitable equivalent such as spatial frequency or angular frequency. For example, a wavelength of 1 μm corresponds to a spatial frequency of 1 $\mu m^{-1}$ and to a frequency of 300 THz. Since various conventions exist for defining Fourier transforms, no significance attaches to convention-dependent details such as the location of factors of $2\pi$, sign conventions, and whether $D(f)$ is regarded as the Fourier transform or inverse Fourier transform of $d(x)$. Any mutually consistent Fourier transform formalism will suffice for practicing the invention.

Practice of the invention also does not depend on whether these Fourier transform pairs are continuous or discrete. In most cases, including the following examples, discrete Fourier transforms are preferred to make use of efficient algorithms such as the fast Fourier transform.

Even though there is a simple relation between $d(x)$ and $D(f)$, it does not follow that $d(x)$ can readily be derived from the desired response $A(f)$. To appreciate this, it is helpful to define the amplitude ($B(f)$) and phase ($\psi(f)$) responses of a QPM device via $D(f)=B(f)\exp(i\psi(f))$, where $B(f)$ is real and non-negative and $\psi(f)$ is real. Now it is clear that specifying $A(f)$ is only a partial specification of the desired spectral response, since the phase is left unspecified. We assume that the designer does not care directly about the phase response (e.g., the common case where efficiency $B^2(f)$ is the quantity of concern).

However, it does not follow that the phase response is irrelevant to QPM design. In fact, a good choice of phase response can improve QPM design (i.e., make $B(f)$ closer to $A(f)$) and a poor choice of phase response can degrade QPM design (i.e., make $B(f)$ farther from $A(f)$), other things being equal. The reason for this is that $d(x)$ is constrained to have a constant amplitude, and varying the phase response affects the influence this constraint has on design fidelity (i.e., how closely $B(f)$ can approach $A(f)$).

Accordingly, step 104 on FIG. 1 is providing an initial phase response $\phi(f)$. The phase response $\phi(f)$ can be regarded as a target phase response specification selected to provide good fidelity between $A(f)$ and $B(f)$. Preferably, $\phi(f)$ is selected such that $d^2\phi(f)/df^2$ is proportional to $A^2(f)$ and more preferably, $\phi(f) \propto \int_0^f (\int_0^{z_2} A^2(z_1) dz_1) dz_2$. This choice of phase response works well in practice, and often provides a non-iterative design solution. The proportionality constant is preferably set to minimize the standard deviation of the values of $h^2(x)$ divided by the average value of $h^2(x)$. Thus, the proportionality constant is set to make $h(x)$ as uniform as possible given other constraints. Standard numerical methods are applicable for determining this constant of proportionality, and since this is a one-dimensional optimization problem, it is not computationally intensive. Other initial target phase responses can also be employed, e.g., in connection with iterative design methods as described below. Specification of the phase response as described herein is a key aspect of the invention.

In addition to having a constant amplitude, $d(x)$ is a real-valued function. Therefore, the responses $A(f)$ and $\phi(f)$ are required to have the corresponding Fourier symmetries (i.e., $A(f)=A(-f)$ and $\phi(f)=-\phi(-f)$). Step 106 on FIG. 1 is calculating $h(x)$ such that $h(x)$ and $H(f)=A(f)\exp(i\phi(f))$ are a Fourier transform pair. The symmetry conditions on $A(f)$ and $\phi(f)$ ensure that $h(x)$ is a real-valued function. If the domain pattern function $d(x)$ could be set equal to (or proportional to) $h(x)$, the QPM design problem would be solved. However, $h(x)$ generally does not have a constant amplitude, so the domain pattern function $d(x)$ needs to be a constant-amplitude approximation to $h(x)$.

It is helpful to regard the process of deriving a constant-amplitude approximation to $h(x)$ as "binarizing" $h(x)$. Accordingly, step 108 on FIG. 1 is binarizing $h(x)$ to provide $d(x)$. Such binarization can be accomplished in various ways.

One method of binarization is to set $d(x)$ proportional to $\text{sgn}(h(x))$, which effectively looks at only the sign of $h(x)$. Other binarization methods that have been developed can be grouped into two categories. In the first category, $d(x)$ is set proportional to $\text{sgn}(h(x)-m(x))$, where $m(x)$ is a modulating waveform. In the second category, $d(x)$ is set proportional to $\text{sgn}(g(x)-m(x))$, where $m(x)$ is a modulating waveform and $g(x)$ is an average of $h(x)$. In addition to these two categories, it is also possible to include frequency domain processing in the binarization process.

In the first category, $d(x)$ is set proportional to $\text{sgn}(h(x)-m(x))$, where $m(x)$ is a modulating waveform preferably selected to provide a $D(f)$ that is substantially proportional to $H(f)$ over a predetermined range of f. Selection of the range of f is problem-dependent and within the skill of an average art worker. Achieving this condition provides good fidelity between $A(f)$ and $B(f)$. Suitable modulating waveforms include triangle waves and sawtooth waves. A triangle wave has equal positive and negative slopes in each period and has no discontinuities, while a sawtooth wave has only one slope in each period and has discontinuities. Triangle wave modulation is preferred to sawtooth wave modulation because the resulting domain sizes tend to be slightly larger. In cases where $m(x)$ is periodic with period T, it is preferred for $1/T$ to be greater than about three times the largest frequency of interest specified by A(f). The amplitude of m(x) is usually set equal to the peak amplitude of h(x), although other choices are possible for the amplitude. Random or pseudorandom waveforms for m(x) are also suitable for practicing the invention. In this description, pseudo-random refers to a deterministic output (e.g., from a random number generator) that passes statistical tests for randomness. Spectral filtering of a random or pseudo-random input can be employed to provide a filtered random or pseudo-random m(x). In practice, good results have been obtained with a pseudo-random m(x) having an amplitude uniformly distributed within a predetermined range.

The second category is like the first, except that h(x) is averaged to provide g(x) inside the sgn( ) function. This average can be a moving average. Alternatively, in cases where m(x) is periodic with period T, g(x) can be given by $$g(x) = \frac{1}{T}\int_{\lfloor x/T \rfloor T}^{(\lfloor x/T \rfloor + 1)T} h(y)\,dy.$$

Here $\lfloor z \rfloor$ (i.e., floor(z)) is the largest integer $\leq z$. Thus within each period i of m(x), an average value of $h_i$ of h(x) is computed. The value of g(x) is the average $h_i$ corresponding to the period containing x. Averaging h(x) to g(x) desirably tends to increase domain size, but in turn tightens tolerances on duty cycle control. To maximize domain size in cases where m(x) is periodic with period T and averaging of h(x) to g(x) is performed, it is preferred for 1/T to be greater than about two times the largest frequency of interest specified by A(f). The selection of what kind of averaging to employ (if any) can be made by an art worker based on overall design and process considerations, taking into account the minimum domain size limit and duty cycle tolerances of the available domain patterning processes.

Binarization can also include frequency-domain processing. More specifically, the D(f) corresponding to a domain pattern function d(x) can be processed to provide a modified function F(f). A function f'(x) is computed such that f'(x) and F(f) are a Fourier transform pair, and f'(x) is binarized to provide f(x) (with any of the above binarization methods). Such processing can provide various useful enhancements to binarization. For example, low pass filtering of D(f) to provide F(f) increases the domain size in f(x) compared to d(x). Increasing the domain size (especially the minimum domain size) is helpful for fabrication, since smaller domains tend to be more difficult to fabricate than larger domains. The response D(f) can also be filtered to reject QPM harmonics. Spectral processing in combination with binarization can be an iterative process or a single-pass process. In an iterative process, the processing of D(f) to obtain F(f), the calculation of f'(x), and the binarization of f'(x) to obtain f(x) are repeated in sequence until a termination condition is satisfied.

In performing iterative binarization, it has been found helpful to monitor the convergence of the process. If a condition of slow convergence is detected, the iteration can be restarted with different initial conditions. Iteration after such restarting is found to converge quickly in most cases, making such restarting a surprisingly effective strategy. In cases where m(x) is random or pseudorandom, the restarting is performed such that a different m(x) is generated. In other cases (e.g., if m(x) is a triangle wave or sawtooth wave) the phase and/or amplitude of m(x) can be perturbed (deterministically or randomly) as part of the restarting, to avoid encountering the same convergence difficulty. Here the phase of m(x) refers to the relative phase between m(x) and h(x).

FIG. 1 also shows optional steps 110, 112, and 114. Optional step 110 is computation of the response $D(f)=B(f)\exp(i\psi(f))$ provided by the domain pattern function d(x). Since the goal is to make B(f) as close as possible to A(f), standard numerical methods are applicable. A figure of merit depending on A(f) and B(f) can be selected (e.g., an integral of the square of the difference between A(f) and B(f) in a predetermined range or ranges of f)). The input phase response $\phi(f)$ (typically in a discretized approximation) can be varied to improve the figure of merit (step 112). Such variation can be iterated (step 114) according to known numerical optimization techniques.

Figure 2:
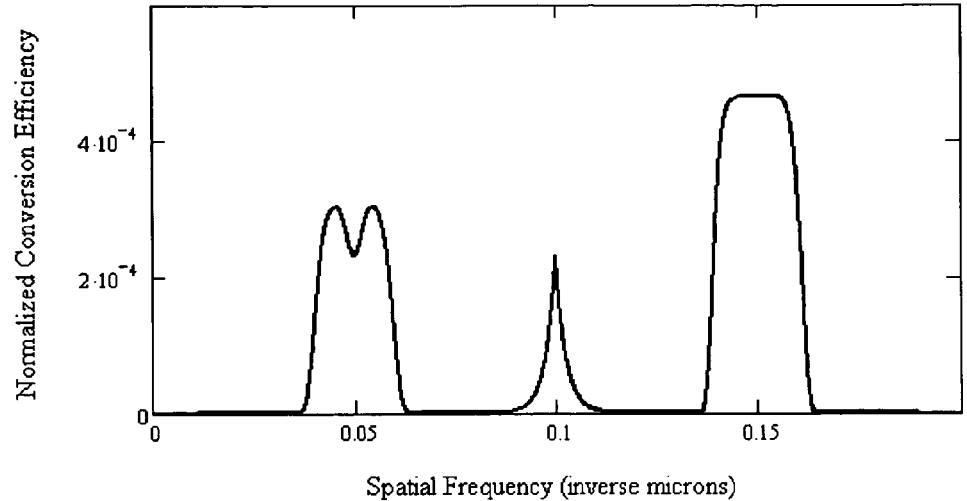
FIG. 2 shows an example of a spectral conversion efficiency specification.

FIG. 2 shows an example of a spectral conversion efficiency specification. The target response of FIG. 2 is used in the examples of FIGS. 3a–c and 4a–c. FIG. 2 shows normalized conversion efficiency, so the corresponding target amplitude response A(f) is the square root of the plot of FIG. 2.

Figure 3A:
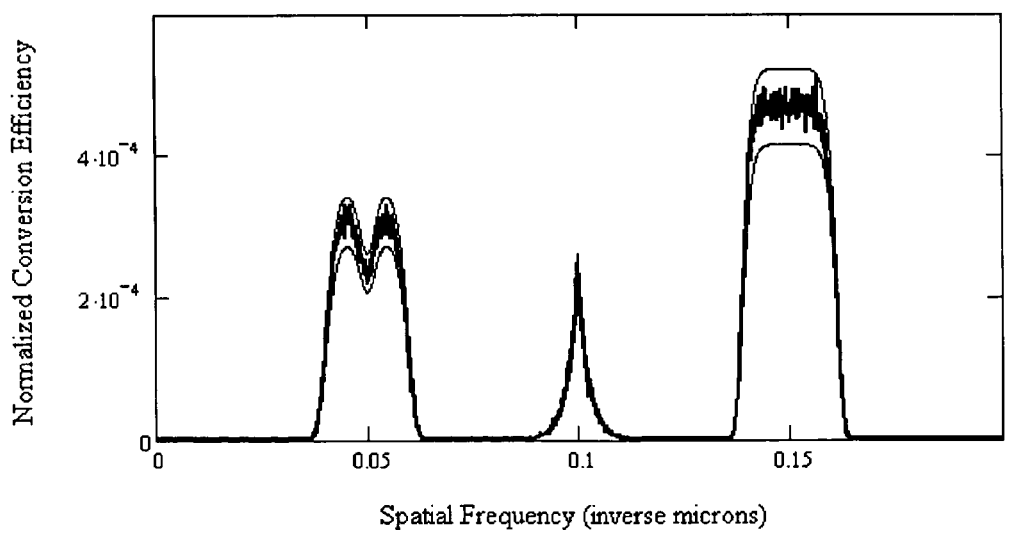
FIGS. 3a–c show a first example of QPM design according to an embodiment of the invention.
Figure 3B:
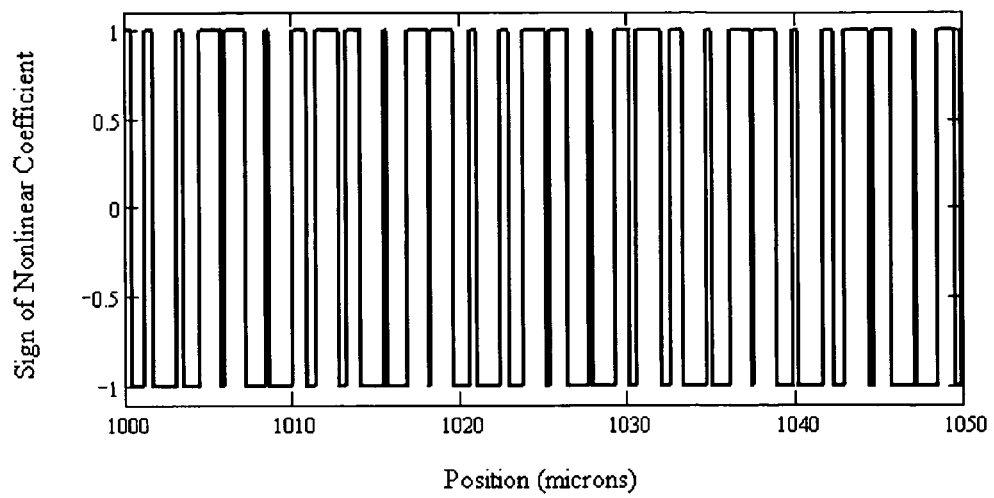
Figure 3C:
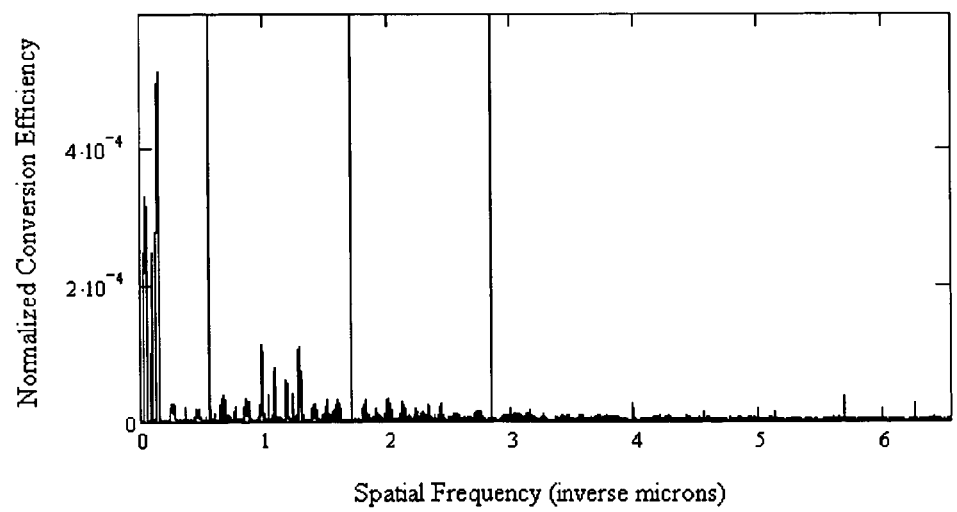

FIGS. 3a–c show a first example of QPM design according to an embodiment of the invention. FIG. 3a shows the spectral response (i.e., $B^2(f)$) plotted between 0.5 dB limits computed from the target spectral response of FIG. 2. Excellent response fidelity is observed in this example. FIG. 3b shows a section of the domain pattern function d(x) in a 50 μm window 1 mm into the device, and FIG. 3c shows the spectral response over a larger range of spatial frequencies. Binarization-induced peaks (near 0.5 $\mu m^{-1}$, 1.7 $\mu m^{-1}$ and 2.8 $\mu m^{-1}$) are visible, as are images of the tuning curve. In this example, the phase response is proportional to $\int_0^f (\int_0^{z_2} A^2(z_1)dz_1)dz_2$, the proportionality constant is optimized as described above, and sgn(h(x)−m(x)) binarization is employed where m(x) is a triangle wave having a fundamental frequency of 0.57 $\mu m^{-1}$ (3 times the largest specified frequency in A(f)). The amplitude of m(x) is set equal to the peak amplitude of h(x).

Figure 4A:
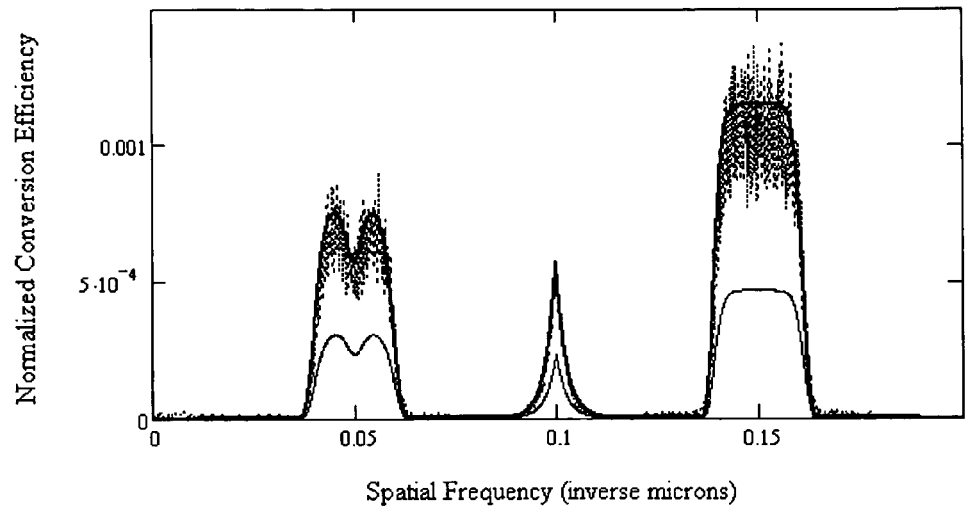
FIGS. 4a–c show a second example of QPM design according to an embodiment of the invention.
Figure 4B:
Figure 4C:
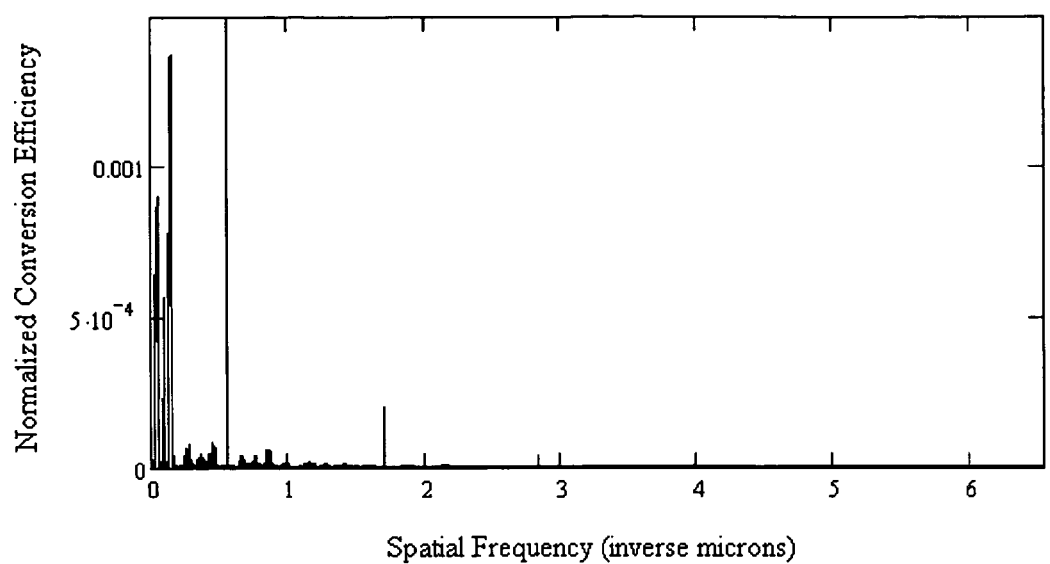

FIGS. 4a–c show a second example of QPM design according to an embodiment of the invention. In this example, a trade is made to increase efficiency and domain size at the expense of somewhat reduced response fidelity. This example is the same as the example of FIGS. 3a–c, except that the amplitude of m(x) is decreased by a factor of $3\pi/4$. FIG. 4a shows the spectral response (i.e., $B^2(f)$). FIG. 4b shows a section of the domain pattern function d(x) in a 50 μm window 1 mm into the device, and FIG. 4c shows the spectral response over a larger range of spatial frequencies. Comparison of FIGS. 4b and 3b show far fewer short domains in FIG. 4b, which can greatly facilitate fabrication. Correspondingly, the high spatial frequency content on FIG. 4c is much less than on FIG. 3c. Considerable design flexibility is provided by the various binarization approaches, and selection of suitable binarization approaches for particular designs in accordance with principles of the invention is within the skill of an art worker.

What is claimed is:
1. A method for designing a quasi-phasematched optical frequency converter, the method comprising:
   a) specifying a non-negative real target spectral amplitude response A(f), wherein A(−f)=A(f);
   b) providing a real initial phase response $\phi(f)$ associated with A(f), wherein $\phi(f)=-\phi(-f)$;
   c) calculating a real function h(x) such that h(x) and $H(f)=A(f)\exp(i\phi(f))$ are a Fourier transform pair;

d) binarizing h(x) to provide a domain pattern function d(x), wherein d(x) is a real constant-amplitude approximation to h(x).

2. The method of claim 1, wherein said providing a phase response comprises providing $\phi(f)$ such that $d^2\phi(f)/df^2$ is proportional to $A^2(f)$.

3. The method of claim 2, wherein said providing a phase response comprises providing $\phi(f) \propto \int_0^f (\int_0^{z_2} A^2(z_1) dz_1) dz_2$.

4. The method of claim 3, wherein $\phi(f) = K \int_0^f (\int_0^{z_2} A^2(z_1) dz_1) dz_2$ and wherein K is selected to minimize a standard deviation of $h^2(x)$ divided by an average value of $h^2(x)$.

5. The method of claim 1, wherein h(x) and H(f) are a discrete Fourier transform pair.

6. The method of claim 1, wherein h(x) and H(f) are a continuous Fourier transform pair.

7. The method of claim 1, wherein said binarizing comprises setting d(x) substantially proportional to sgn(h(x)).

8. The method of claim 1 further comprising:
e) calculating a function $D(f)=B(f) \exp(i\psi(f))$ such that D(f) and d(x) are a Fourier transform pair, wherein B(f) is real and non-negative and wherein $\psi(f)$ is real.

9. The method of claim 8, wherein said binarizing comprises setting d(x) substantially proportional to sgn(g(x)−m(x)), wherein m(x) is a modulating waveform and wherein g(x) is an average of h(x).

10. The method of claim 9, wherein m(x) is periodic with period T, and wherein $$g(x) = \frac{1}{T} \int_{\lfloor x/T \rfloor T}^{(\lfloor x/T \rfloor + 1)T} h(y) dy.$$

11. The method of claim 9, wherein g(x) is a moving average of h(x).

12. The method of claim 8, wherein said binarizing comprises setting d(x) substantially proportional to sgn(h(x)−m(x)), wherein m(x) is a modulating waveform selected such that D(f) is substantially proportional to H(f) over a predetermined range of f.

13. The method of claim 12, wherein said modulating waveform is a triangle wave or a sawtooth wave.

14. The method of claim 12, wherein said modulating waveform is random or pseudorandom.

15. The method of claim 14, wherein a power spectral density of said modulating waveform is determined by passing said waveform through a filter.

16. The method of claim 14, wherein said modulating waveform has an amplitude that is uniformly distributed within a predetermined range.

17. The method of claim 8, wherein said binarizing further comprises:
processing said function D(f) to provide a modified function F(f);
computing a function f'(x) such that f'(x) and F(f) are a Fourier transform pair;
binarizing f'(x) to provide a domain pattern function f(x), wherein f(x) is a real constant-amplitude approximation to f'(x).

18. The method of claim 17, wherein said processing comprises low pass filtering, whereby a minimum domain size in f(x) is increased compared to a minimum domain size in d(x).

19. The method of claim 18, wherein said processing comprises filtering to reject quasi-phasematching harmonics.

20. The method of claim 17, further comprising repeating said processing, said computing and said binarizing f'(x) in sequence until a termination condition is satisfied.

21. The method of claim 20, further comprising monitoring a convergence rate of said repeating and resetting said repeating if a condition of slow convergence is detected.

22. The method of claim 8, further comprising:
f) modifying said phase response $\phi(f)$ responsive to a figure of merit depending on A(f) and B(f).

23. The method of claim 22, further comprising
g) iteratively repeating said steps (c) through (f) in sequence until a termination condition depending in part on said figure of merit is satisfied.

24. A quasi-phasematched optical frequency converter comprising:
a quasi-phasematched active region having a real constant-amplitude domain pattern function d(x);
wherein a function D(f) and the pattern function d(x) are a Fourier transform pair;
wherein a non-negative real amplitude response A(f) and a real phase response $\phi(f)$ of the active region are defined via $D(f)=A(f) \exp(i\phi(f))$;
wherein $d^2\phi(f)/df^2$ is substantially proportional to $A^2(f)$.

25. The optical frequency converter of claim 24, wherein a relation $\phi(f) \propto \int_0^f (\int_0^{z_2} A^2(z_1) dz_1) dz_2$ substantially holds between A(f) and $\phi(f)$.

* * * * *